United States Patent
Auer

(10) Patent No.: US 9,193,387 B2
(45) Date of Patent: Nov. 24, 2015

(54) AUTOMATIC FORWARD PARKING IN PERPENDICULAR PARKING SPACES

(75) Inventor: Richard Auer, Wolfburg (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 13/518,697

(22) PCT Filed: Nov. 23, 2010

(86) PCT No.: PCT/EP2010/007091
§ 371 (c)(1),
(2), (4) Date: Aug. 17, 2012

(87) PCT Pub. No.: WO2011/076322
PCT Pub. Date: Jun. 30, 2011

(65) Prior Publication Data
US 2012/0316732 A1    Dec. 13, 2012

(30) Foreign Application Priority Data

Dec. 23, 2009 (DE) .......................... 10 2009 060 169

(51) Int. Cl.
*B62D 6/00* (2006.01)
*B62D 15/02* (2006.01)
*G08G 1/16* (2006.01)

(52) U.S. Cl.
CPC ........ *B62D 15/0265* (2013.01); *B62D 15/0285* (2013.01); *G08G 1/168* (2013.01)

(58) Field of Classification Search
CPC ............ G08G 1/14; G07B 15/02; B08G 1/14; B62D 6/00
USPC ............................ 701/1, 41, 200; 340/932.2; 180/167–169
See application file for complete search history.

(56) References Cited

U.S. PATENT DOCUMENTS 5,995,884 A * 11/1999 Allen et al. ...................... 701/24
7,555,379 B2 * 6/2009 Endo et al. ....................... 701/41
(Continued)

FOREIGN PATENT DOCUMENTS

CN    1427784 A    7/2003
DE    3844340 A1    7/1990
(Continued)

OTHER PUBLICATIONS

Search Report for International Patent Application No. PCT/EP2010/007091; Feb. 25, 2011.
(Continued)

*Primary Examiner* — Calvin Cheung
*Assistant Examiner* — Martin Weeks
(74) *Attorney, Agent, or Firm* — Barnes & Thornburg LLP

(57) ABSTRACT

A method for forward parking a motor vehicle in a perpendicular parking space, wherein the motor vehicle has environment sensors for detecting environment data and obstacles in the environment of the motor vehicle, including pre-aligning the motor vehicle in front of the perpendicular parking space such that a target steering angle lies between a maximum steering angle $\delta_{max}$ and a minimum steering angle $\delta_{min}$, iterative searching of the admissible steering angle range between the maximum steering angle $\delta_{max}$ and the minimum steering angle $\delta_{min}$ for a current steering angle $\delta_{akt}$, during a forward maneuver of the vehicle into the perpendicular parking space, wherein the current steering angle $\delta_{akt,i}$ ensures a maximum free path length $s_i$, i=01 ... , n into the perpendicular parking space without the vehicle hitting obstacles, and terminating the forward maneuver if the end of the parking operation has been reached or a reversing maneuver has to be carried out owing to an obstacle.

9 Claims, 4 Drawing Sheets

(56) References Cited

U.S. PATENT DOCUMENTS

| | | | |
|---|---|---|---|
| 2005/0073433 A1* | 4/2005 | Gunderson et al. | 340/903 |
| 2005/0122234 A1* | 6/2005 | Danz et al. | 340/932.2 |
| 2006/0136109 A1* | 6/2006 | Tanaka et al. | 701/41 |
| 2009/0099729 A1* | 4/2009 | Bolio et al. | 701/41 |
| 2010/0013670 A1* | 1/2010 | Hueppauff et al. | 340/932.2 |
| 2010/0235053 A1* | 9/2010 | Iwakiri et al. | 701/42 |

FOREIGN PATENT DOCUMENTS

| | | |
|---|---|---|
| DE | 60101788 T2 | 11/2004 |
| DE | 102009006331 A1 | 10/2009 |
| DE | 102009006336 A1 | 10/2009 |
| EP | 1561673 A2 | 8/2005 |
| EP | 2143618 A1 | 1/2010 |
| WO | 02075354 A1 | 9/2002 |

OTHER PUBLICATIONS

Office Action from Chinese Patent Application No. 201080064605.7; May 19, 2015.

Office Action from Chinese Patent Application No. 201080064605.7; Oct. 11, 2014.

* cited by examiner

AUTOMATIC FORWARD PARKING IN PERPENDICULAR PARKING SPACES

PRIORITY CLAIM

This patent application is a U.S. National Phase of International Patent Application No. PCT/EP2010/007091, filed 23 Nov. 2010, which claims priority to German Patent Application No. 10 2009 060 169.4, filed 23 Dec. 2009, the disclosures of which are incorporated herein by reference in their entirety.

FIELD

Embodiments of the present disclosure relate to a method for the automatic forward parking of a motor vehicle in a perpendicular parking space and to a corresponding driver assistance system.

BACKGROUND

In current parking assist systems or driver assistance systems for automatic parking, in which case parking both in the longitudinal parking spaces and in perpendicular parking spaces is carried out here, a parking space is measured using a suitable sensor system as the parking space is passed, and reverse parking is then carried out. With longitudinal parking spaces, this is the only possible way of parking in a longitudinal parking space since the rear axle generally cannot be steered. Longitudinal parking spaces in which forward parking is possible are so large, however, that it would be necessary to refer to a lane change, rather than parking.

Such a reverse parking operation into a parking space is described, for example, in DE 10 2009 006 336 A1. There, an automatic parking operation of a motor vehicle is monitored, in which case, before the actual parking operation, a parking space is measured using a camera-based method as the motor vehicle passes the parking space, and obstacles in the environment of the parking space are also determined. During the automatic parking operation, the camera-based method is still used to measure the environment of the motor vehicle, the obstacles newly detected in the measurement during the parking operation being compared with previously detected obstacles and a corresponding measure being carried out if there is a discrepancy between newly detected obstacles and known obstacles.

A method for automatically parking a motor vehicle in a parking space or for moving a motor vehicle out of a parking space can also be gathered from DE 10 2009 006 331 A1. In this case, the parking space is determined by an environment detection system of the motor vehicle and a target trajectory and a position end point relative to the parking space on the target trajectory are defined. A suitable steering angle is then calculated on the basis of the current vehicle position and this steering angle is used for parking or leaving a parking space.

The common feature of all of these known methods is that, after the parking space has been measured, a target trajectory is defined and is iteratively readjusted if necessary, along which trajectory the motor vehicle reverses into the parking space in one or more maneuvers.

The disadvantage of the reverse-parking strategies is that, on the one hand, the subsequent traffic is hindered during reverse-parking into a perpendicular parking space and there is also the risk of a subsequent vehicle taking the free parking space by means of forward parking and of forward parking usually being carried out both in parking garages and in garages.

SUMMARY

Therefore, the disclosed embodiments are based on specifying a method for the forward parking of a motor vehicle in a perpendicular parking space, including a garage.

This is achieved by means of a method without previous measurement of the parking space having the features of claim 1, a method with previous measurement of the perpendicular parking space according to the features of claim 10 and a driver assistance apparatus for carrying out the methods having the features of claim 12.

BRIEF DESCRIPTION OF THE FIGURES

The embodiments of the disclosure are described below using the drawings, in which.

DETAILED DESCRIPTION

Figure 1:
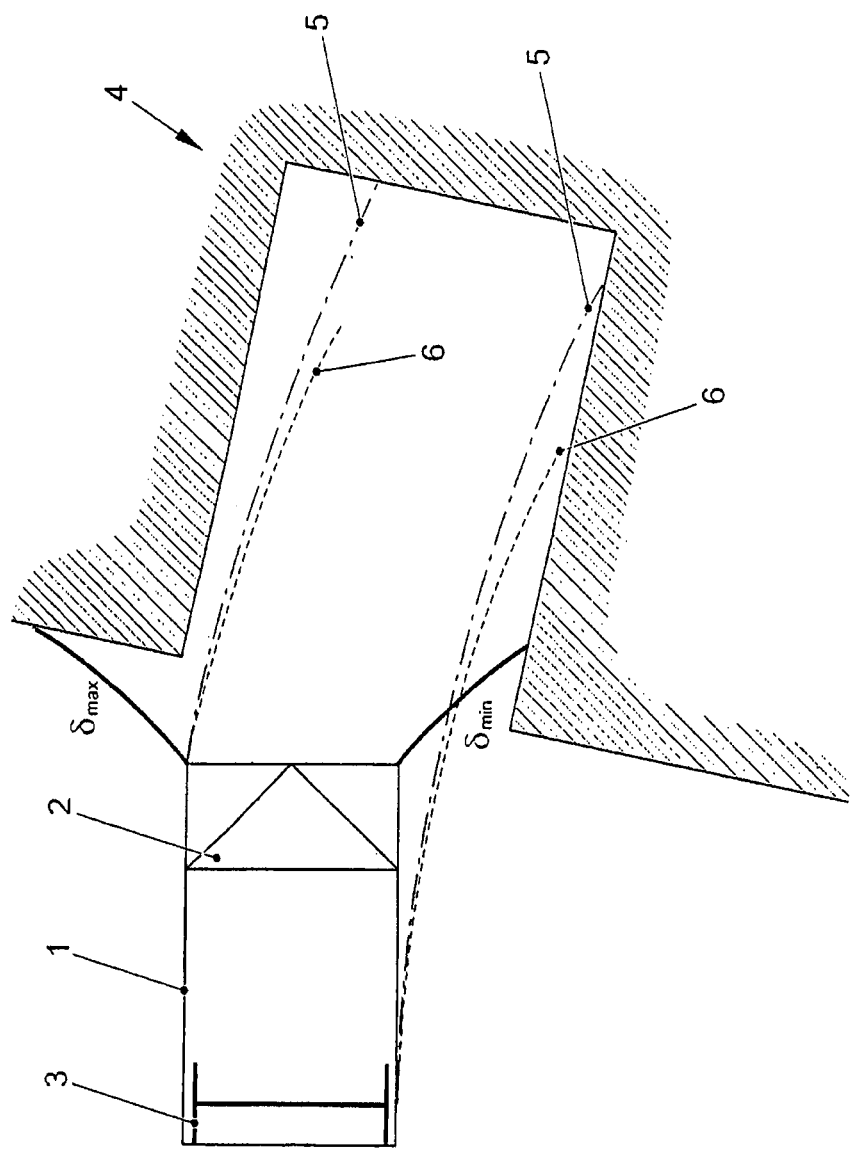
FIG. 1 shows a forward parking operation according to a first disclosed embodiment.

In a first disclosed embodiment, the method for the forward parking of a motor vehicle in a perpendicular parking space, the motor vehicle having environment sensors for determining environment data and obstacles in the environment of the motor vehicle, includes:

prealigning the motor vehicle in front of the perpendicular parking space in such a manner that a setpoint steering angle is between a maximum steering angle $\delta_{max}$ and a minimum steering angle $\delta_{min}$, iteratively searching the permissible steering angle range between the maximum steering angle $\delta_{max}$ and the minimum steering angle $\delta_{min}$ for a current steering angle $\delta_{curr,i}$ during a forward maneuvering movement of the motor vehicle into the perpendicular parking space, the current steering angle $\delta_{curr,i}$ giving rise to a maximum free path length $s_i$, $i=0, \ldots n$, into the perpendicular parking space without the vehicle hitting obstacles, and terminating the forward maneuvering movement if the end of the parking operation has been reached or a reverse maneuvering movement must be carried out on account of an obstacle.

In this case, the maximum steering angle $\delta_{max}$ and minimum steering angle $\delta_{min}$ may be in the range ±17°.

Obstacles which have been found are optionally recorded, that is to say stored, in a map of the environment by the environment sensors. Obstacles which disappear again are likewise removed again from the map of the environment.

The first step i=0 of the iterative search may be carried out by scanning a predefined curvature range κveh;i=0 with a predefined curvature iteration size Δκ in order to determine an ideal curvature estimated value, and the forward maneuvering movement of the motor vehicle is carried out along the ideal curvature estimated value of the first step. In this case, the curvature estimated value of the first step corresponds to the maximum free path length si=0. Furthermore, the curvature estimated value determines the steering angle of the vehicle.

The predefined curvature range of the first step comprises the range of −0.15 to 0.15, the curvature iteration size Δκ of the first iteration step being 0.0005. In this case, the predefined curvature range of −0.15 to +0.15 corresponds to a minimum steering angle and a maximum steering angle of approximately ±17° for a wheel base of approximately 2 m.

For the second step and the subsequent steps i=1, 2, ..., n of the iteration, the curvature estimated value of the previous step is used as the initial value for the current step, scanning being carried out around the initial value of the previous step with a current curvature iteration size to determine the current curvature estimated value of the i-th step, the current curvature iteration size being a function of the maximum path length si-1 of the previous step. Furthermore, the curvature range to be searched in the current step to determine the current curvature estimated value is a function of the curvature iteration size of the current step, and the forward maneuvering movement of the motor vehicle is carried out along the current curvature estimated value of the second step and the subsequent steps.

The curvature iteration size of the second step and the subsequent steps is optionally determined by means of the following formula:

$$\Delta \kappa = \frac{\Delta \kappa_0}{(\min(s_{i-1}, \sigma_0)/\sigma_0)^2} \quad (1)$$

In this case, $s_{i-1}$ is the maximum distance determined in the previous step and $\sigma_0$ is an experimentally determined constant. In the present case, $\sigma_0=3$ m has proved to be a reasonable value.

To determine the current curvature estimated value, the curvatures, that is to say the following curvature range, are optionally searched:

$$\kappa_{search,j} = \kappa_0 + (j-3)\Delta \kappa \quad (2)$$

In this case, optionally j=0, 1, ... m, where m is a natural number >0. Optionally, m=6, in other words the search range comprises seven values. Other values for m are naturally possible, as a result of which the search range becomes larger or smaller. Furthermore, $K_0$ is defined as the curvature of the previous step, that is to say $$\kappa_0 = \kappa_{veh,i-1} \quad (3)$$

Furthermore, it is possible to determine the vehicle alignment relative to the parking space by considering the detected lateral obstacles which are within a predefined distance value, a left-hand regression line and a right-hand regression line respectively being placed through the obstacle points defined by distances between the lateral, that is to say left-hand and right-hand, obstacles. The position and alignment of the vehicle relative to the perpendicular parking space can then be determined from the two regression lines by means of averaging and by considering the enclosed angle. In this case, the position and alignment during the forward maneuvering movement can likewise be taken into account. For the reverse maneuvering movement, the detection of the alignment of the vehicle in the parking space and, therefrom, the average distances from the vehicle to the left and the right is used to look for a favorable starting position for the subsequent forward maneuvering movement.

A second disclosed embodiment of the method for the forward parking of a motor vehicle in a perpendicular parking space involves the motor vehicle having environment sensors for determining environment data and obstacles in the environment of the motor vehicle, a perpendicular parking space being measured by the environment sensors as the motor vehicle passes the perpendicular parking space. A parking trajectory for the forward parking of the motor vehicle relative to the current location of the motor vehicle is then calculated, the motor vehicle being aligned by a reverse movement in such a manner that it can park in the perpendicular parking space with a subsequent forward movement. For the iterative forward parking of the motor vehicle in the perpendicular parking space, the vehicle can move along the calculated trajectory, the trajectory being able to be corrected again and again by means of current environment data. It is also possible for the forward movement of the motor vehicle to be effected by means of the above-described iterative method of the first embodiment.

As already mentioned, during the automatic parking operation, the environment sensors can still measure the environment of the vehicle, and the parking trajectory can thus be adapted to the new environment data.

A driver assistance system for the automatic parking of a motor vehicle and for carrying out the methods described above comprises environment sensors for determining environment data relating to the motor vehicle, a calculation unit for continuously calculating a parking trajectory from the environment data, and a controller which moves the motor vehicle. In this case, the controller comprises actuators for accelerating and decelerating the motor vehicle, actuators for a braking intervention and actuators for a steering intervention.

FIG. 1 shows a vehicle 1 which has a diagrammatically illustrated front axle 2 and rear axle 3 and is in front of a parking space 4. In this case, a steering angle range δmin and δmax is diagrammatically illustrated in FIG. 1. The steering angle range between δmin and δmax is searched for steering angles which make it possible to travel as far as possible without hitting obstacles. Two possible curvatures, that is to say steering angles, 5, 6 are illustrated in FIG. 1, in which case it is clear that it is possible to travel further into the perpendicular parking space 4 with the curve 5 than with the curve 6. The route which provides the greatest distance without hitting an obstacle, that is to say the curve 5 in the present case, predefines the steering angle, that is to say the curvature, which is then taken in the first step. As a note, it is remarked that travel straight ahead is carried out with the proposed iterative method in the absence of obstacles. Therefore, the method can be used not only in garages but also in confined driving situations.

At the start of the keying-in algorithm, the entire possible curvature range κi=0=-0.15 ... 0.15 is scanned in curvature iteration sizes of Δκ=0.0005 to obtain a lower initial value for κi=0. This initial value and also all subsequent values always use the curvature determined last as a good estimation of the current iteration step to restrict the search space for the subsequent steps. This is because, in the subsequent steps, there is a restriction for reasons of the computation power of the search space and a search is carried out for new optimum curvatures only in the area surrounding the curvature determined last. to escape from local minima which are produced, in particular, when the vehicle approaches an obstacle, the curvature iteration size of each step is coupled to the free path length si-1 from the last step, that is to say $$\Delta \kappa = \frac{\Delta \kappa_0}{(\min(s_{i-1}, \sigma_0)/\sigma_0)^2} \quad (1)$$

where $\sigma_0=3$ m is an experimentally determined constant and $s_{i-1}$ is the maximum distance determined from the last step. The local minima, where a current minimum may also be a global minimum, can be recognized from the fact that the maximum distance becomes smaller and smaller. Therefore, the search range is then increased to possibly escape from a local minimum.

When searching for a new ideal curvature, the curvatures $$\kappa_{search,j} = \kappa_0 + (j-3)\Delta\kappa \quad (2)$$

around the curvature from the last step are checked, where j can assume the values j=0, . . . , 6 and $K_0$ is the curvature found in the preceding step, that is to say $K_0 = K_{veh,i-1}$.

With each of these path curvatures, an area on the roadway which is restricted by the vehicle boundaries is defined. Therefore, in the case of a left turn, the left rear corner and the front right corner form the area boundary and, in the case of a right turn, the front left corner and the rear right corner form the area boundary, as is also illustrated by the curves 5, 6 in FIG. 1.

There are now two possibilities of why a forward movement must be stopped. Either the vehicle has reached the end of the parking operation or the vehicle must carry out a reverse maneuvering movement to circumvent an obstacle.

Figure 2B:
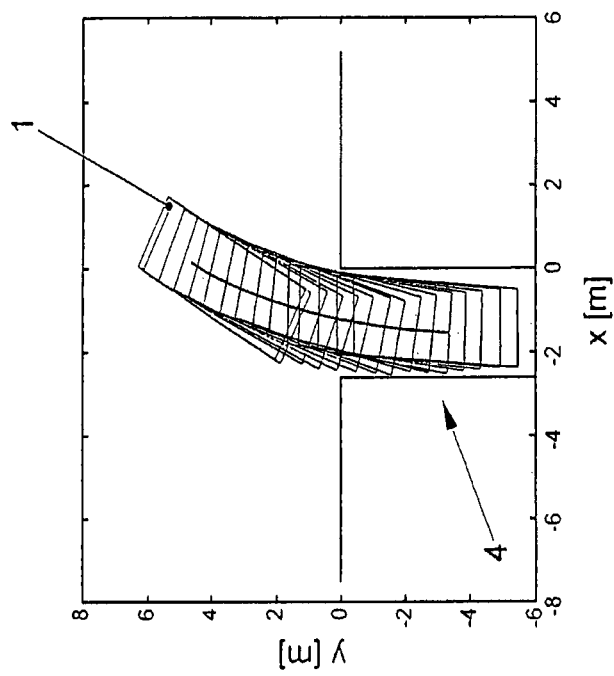
FIGS. 2a and 2b show single-maneuver forward parking maneuvers.
Figure 2A:
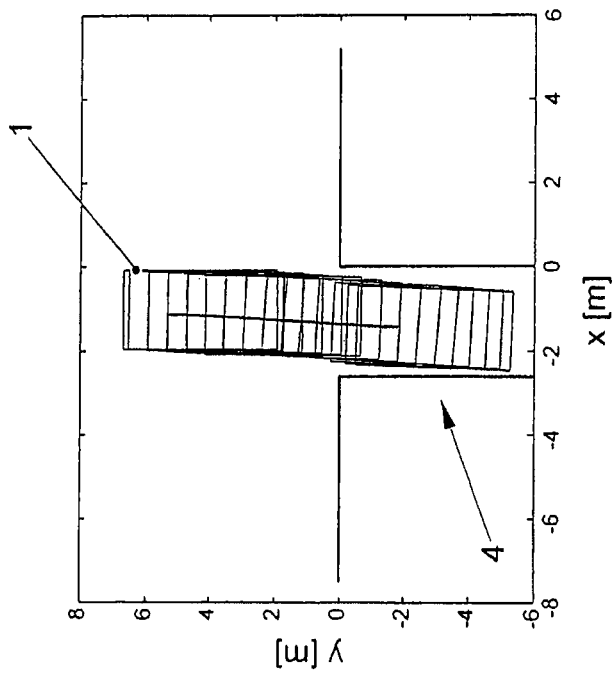

FIG. 2a and FIG. 2b thus show two possible single-maneuver parking scenarios for different starting positions of the vehicle 1 in front of the parking space 4. In other words, the driver approaches a favorable starting position for forward parking, that is to say he positions himself favorably in front of a garage, for example, and gives the driver assistance system the signal to carry out the parking operation using the iterative procedure.

However, during forward parking, the situation may occur in which the steering lock would mean a long collision-free route for the front of the vehicle but the side of the vehicle would collide with an obstacle, for example one of the corners of a garage. If this is the case, the vehicle must first reverse to achieve a favorable starting position.

Figure 3:
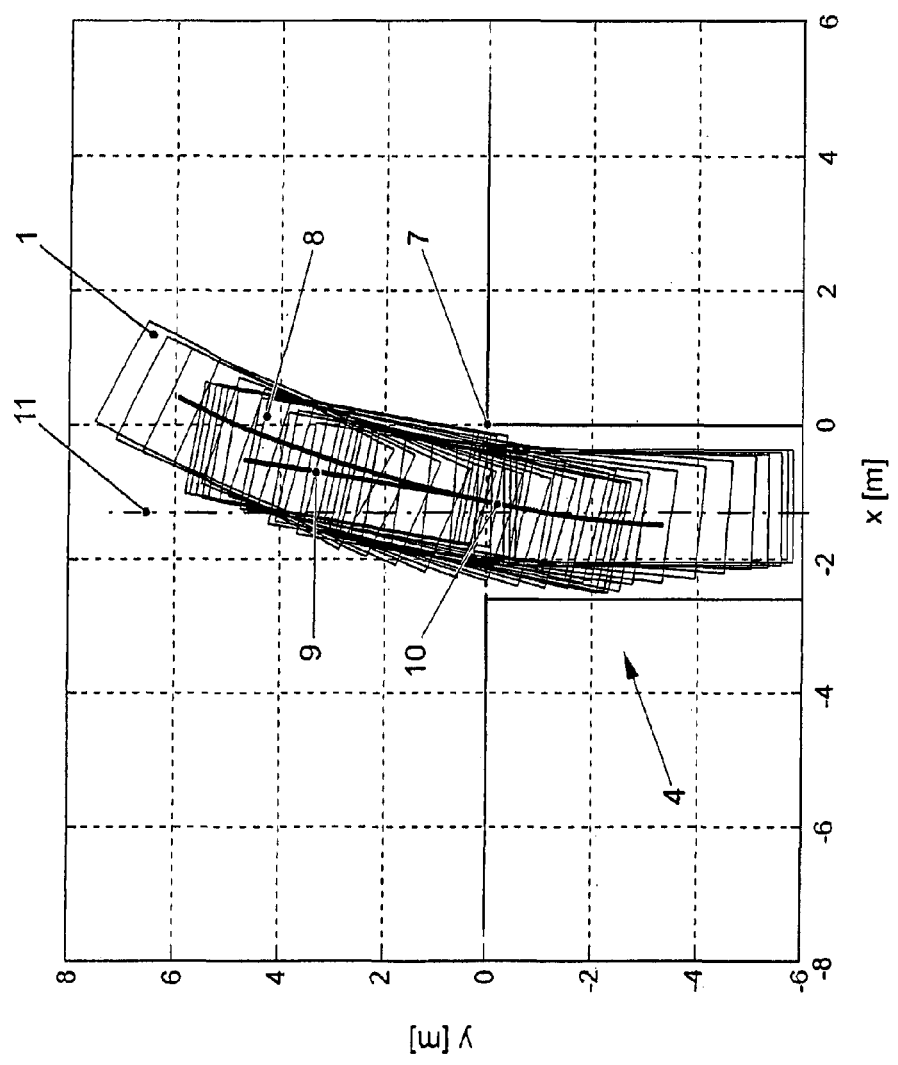
FIG. 3 shows a diagrammatic illustration of multi-maneuver parking.

This is illustrated in FIG. 3 in which the vehicle 1 would hit the left-hand edge (viewed in the direction of travel) of the perpendicular parking space in the fifth iteration step. Consequently, the vehicle carries out a reverse movement to avoid a collision with an obstacle. In other words, starting from an unfavorable starting position of the vehicle 1 in front of the perpendicular parking space 4, the vehicle carries out a first forward movement 8 until the risk of a collision between a side of the vehicle 1 and a corner 7 of the perpendicular parking space 4 is imminent. To avoid the collision, the vehicle carries out a first reverse movement 9 to maneuver the vehicle 1 into a more favorable new starting position. For this purpose, the last position of the vehicle 1 in the parking space 4 along the first forward movement and its alignment can be taken into account to arrive at a more favorable new starting position. In other words, the longitudinal axis of the vehicle 1 must be brought closer to the longitudinal axis 11 of the perpendicular parking space 4. The vehicle 1 then carries out a new second forward movement 10 into the parking space 4.

The end of the forward parking operation is reached when either the end of the parking space is reached, in which case a parking space detection defines a destination, or when the driver forwards a corresponding signal to the vehicle. The realization of whether onward travel is blocked with an obstacle can be predefined by means of a minimum distance.

Figure 4:
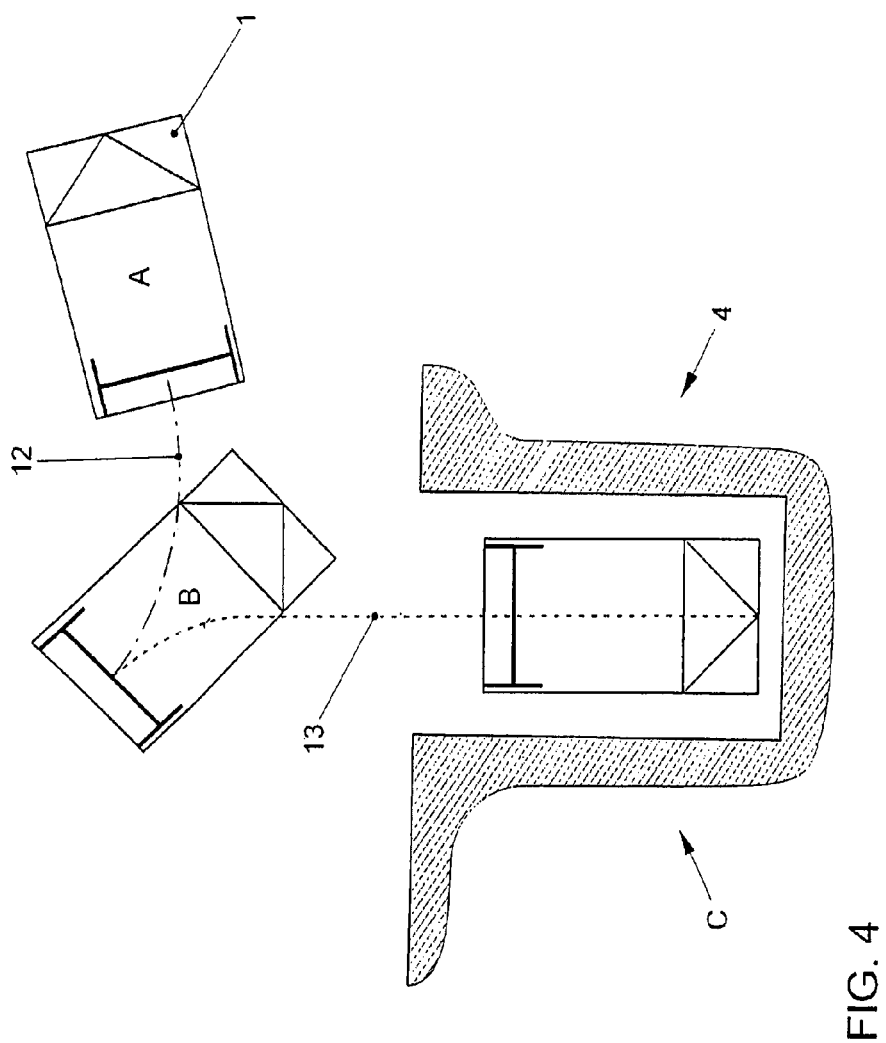
FIG. 4 shows a diagrammatic illustration of a parking operation according to a second disclosed embodiment.

FIG. 4 finally shows a parking operation after previous measurement of the parking space. In this case, the vehicle 1 is driven past the parking space 4 and has measured the parking space 4 using suitable environment sensors. It was also signaled to the driver that the parking space is large enough. Starting from a starting position A, the driver assistance unit calculates a parking trajectory, a first reverse movement 12 changing the vehicle from the position A to an intermediate position B which is suitable for a forward parking operation. The vehicle 1 is changed to the position C in the parking space 4 with a subsequent forward movement 13. Conventional trajectory planning systems can be used to plan the trajectory of the forward movement, the iterative forward parking method described above likewise being able to be used for the forward trajectory 13.

LIST OF REFERENCE SYMBOLS

1 Vehicle
2 Front axle (steerable)
3 Rear axle
4 Parking space
5 Curve
6 Curve
7 Corner of the perpendicular parking space
8 First forward movement
9 First reverse movement
10 Second forward movement
11 Longitudinal axis of the parking space
12 Reverse movement
13 Forward movement
A Starting position
B Intermediate position
C End position

The invention claimed is:

1. A method for forward parking of a motor vehicle in a perpendicular parking space, the motor vehicle having environment sensors for determining environment data and obstacles in an environment of the motor vehicle, comprising:
   prealigning the motor vehicle in front of the parking space in such a manner that a setpoint steering angle $\delta_{free}$ is between a maximum steering angle $\delta_{max}$ and a minimum steering angle $\delta_{min}$;
   iteratively searching, using the controller, a permissible steering angle range between the maximum steering angle $\delta_{max}$ and the minimum steering angle $\delta_{min}$ to identify and select a current steering angle for a forward maneuvering movement of the motor vehicle into the perpendicular parking space, that current steering angle enabling the vehicle to cover a maximum free path length $s_i$, i=[0, . . . n] while the vehicle travels in the forward maneuvering movement into the perpendicular parking space without hitting obstacles; and
   terminating that forward maneuvering movement having the current steering angle if the end of the parking operation has been reached or a reverse maneuvering movement must be carried out to avoid hitting an obstacle,
   wherein the vehicle alignment with respect to the perpendicular parking space is determined by determining distances between detected lateral obstacles that are within a predefined distance value and by placing a regression line through each of the left-hand and right-hand obstacle points, wherein a distance between the left-hand and right-hand obstacle points is less than the predetermined distance value, and wherein each of the regression lines forms an angle relative to the vehicle longitudinal axis and a mean value of those relative angles forms a measure of the alignment of the motor vehicle with respect to the perpendicular parking space, and
   wherein the measure of the alignment is used to detect the positioning of the motor vehicle in the parking space with respect to the forward maneuvering movement and, for the reverse maneuvering movement, is used to determine a favorable starting position for the next forward maneuvering movement, wherein, a first iteration i=0 of the iterative search is carried out by scanning a predefined curvature range with a predefined curvature iteration size to determine an ideal curvature estimated value which corresponds to the current steering angle, and the forward maneuvering movement of the motor vehicle is carried out along the ideal curvature estimated value of the first iteration, wherein the curvature estimated value of the first iteration corresponds to the maximum free path length, wherein the maximum free path length is a vehicle movement path length that provides the maximum distance traveled without the vehicle hitting an obstacle.

2. The method of claim 1, wherein both obstacles which have been found and disappearing obstacles are recorded in a map of the environment or removed from a map of the environment.

3. The method of claim 1, wherein the predefined curvature range of the first iteration comprises the range $\kappa_{veh;i=0}$ of −0.15 to 0.15, the first curvature iteration size being $\Delta\kappa_0 = 0.0005$.

4. The method of claim 1, wherein, in a second iteration and subsequent iterations i=1, 2, . . . , n of the iteration, the curvature estimated value $\kappa_{i-1}$ of the previous step is used as the initial value for the current iteration, scanning being carried out around the initial value with a current curvature iteration size $\Delta\kappa_i$, which is a function of the maximum path length $s_{i-1}$ of the previous iteration, in order to determine the current curvature estimated value $\kappa_i$, and the curvature range to be searched in the current iteration to determine the current curvature estimated value $\kappa_i$, being a function of the curvature iteration size of the current iteration, and the forward maneuvering movement of the motor vehicle is carried out along the current curvature estimated value of the second iteration and the subsequent iterations.

5. The method of claim 4, wherein the curvature iteration size of the second iteration and the subsequent iterations is determined as $$\Delta\kappa_i = \frac{\Delta\kappa_0}{(\min(s_{i-1}, \sigma_0)/\sigma_0)^2},$$

where $\sigma_0$ is a predefined constant and $s_{i-1}$ is the maximum distance determined in the previous step.

6. The method of claim 4, wherein, to determine the current curvature estimated value $\kappa_i$, the curvatures $\kappa_{search,j} = \kappa_{i-1} + (j-3)\Delta\kappa_i$ for j=0, 1, . . . , m are searched.

7. A method for forward parking of a motor vehicle in a perpendicular parking space, the motor vehicle having environment sensors for determining environment data and obstacles in the environment of the motor vehicle, the method comprising:

measuring the perpendicular parking space by the environment sensors as the motor vehicle passes the perpendicular parking space;

calculating a parking trajectory for forward parking relative to the current location of the motor vehicle, the motor vehicle being aligned by a reverse movement to park in the perpendicular parking space with a subsequent forward movement, wherein the vehicle alignment with respect to the perpendicular parking space is determined by determining distances between detected lateral obstacles that are within a predefined distance value and by placing a regression line through each of the left-hand and right-hand obstacle points, wherein a distance between the left-hand and right-hand obstacle points is less than a predetermined distance value, and wherein each of the regression lines forms an angle relative to the vehicle longitudinal axis and a mean value of those relative angles forms a measure of the alignment of the motor vehicle with respect to the perpendicular parking space, wherein the measure of the alignment is used to detect the positioning of the motor vehicle in the parking space with respect to the forward maneuvering movement and, for the reverse maneuvering movement, is used to determine a favorable starting position for the next forward maneuvering movement, and wherein the calculation of the parking trajectory also includes iteratively searching, using the controller, a permissible steering angle range between the maximum steering angle and the minimum steering angle to identify and select a current steering angle for a forward maneuvering movement of the motor vehicle into the perpendicular parking space, that current steering angle enabling the vehicle to cover a maximum free path length $s_i$, i=[0, . . . n] while the vehicle travels in the forward maneuvering movement into the perpendicular parking space without hitting obstacles, wherein, a first iteration i=0 of the iterative search is carried out by scanning a predefined curvature range with a predefined curvature iteration size to determine an ideal curvature estimated value which corresponds to the current steering angle, and the forward maneuvering movement of the motor vehicle is carried out along the ideal curvature estimated value of the first iteration, wherein the curvature estimated value of the first iteration corresponds to the maximum free path length, wherein the maximum free path length is a vehicle movement path length that provides the maximum distance traveled without the vehicle hitting an obstacle.

8. The method of claim 7, wherein, during the automatic parking operation, the environment sensors continuously measure the environment of the motor vehicle, and the parking trajectory is adapted to the measured environment data.

9. A driver assistance system for the automatic parking of a motor vehicle in a perpendicular parking space, the system comprising:

environment sensors for determining environment data relating to the motor vehicle;

a calculation unit for continuously calculating a parking trajectory from the environment data; and a controller for moving the motor vehicle, wherein the calculation unit calculates the parking trajectory by determining vehicle alignment with respect to the perpendicular parking space by determining distances between detected lateral obstacles that are within a predefined distance value and by placing a regression line through each of the left-hand and right-hand obstacle points, wherein a distance between the left-hand and right-hand obstacle points is less than a predetermined distance value, wherein each of the regression lines forms an angle relative to the vehicle longitudinal axis and a mean value of those relative angles forms a measure of the alignment of the motor vehicle with respect to the perpendicular parking space, wherein the measure of the alignment is used to detect the positioning of the motor vehicle in the parking space with respect to the forward maneuvering movement and, for the reverse maneuvering movement, is used to determine a favorable starting position for the next forward maneuvering movement, and wherein the calculation of the parking trajectory also includes iteratively searching, using the controller, a permissible steering angle range between the maximum steering angle and the minimum steering angle to identify and select a current steering angle for a forward maneuvering movement of the motor vehicle into the perpendicular parking space, that current steering angle enabling coverage of a maximum free path length $s_i$, i=[0, . . . n] while the vehicle travels in the forward maneuvering movement into the perpendicular parking space without hitting obstacles, wherein, a first iteration i=0 of the iterative search is carried out by scanning a predefined curvature range with a predefined curvature iteration size to determine an ideal curvature estimated value which corresponds to the current steering angle, and the forward maneuvering movement of the motor vehicle is carried out along the ideal curvature estimated value of the first iteration, wherein the curvature estimated value of the first iteration corresponds to the maximum free path length, wherein the maximum free path length is a vehicle movement path length that provides the maximum distance traveled without the vehicle hitting an obstacle.

* * * * *